(No Model.)

H. R. SCHNARR.
HOLDBACK FOR CARRIAGES.

No. 484,464. Patented Oct. 18, 1892.

Witnesses:
Louis Meese
Chas Piper

Henry R Schnarr
Inventor,
By E. R. Gleason
his Atty

UNITED STATES PATENT OFFICE.

HENRY RUDOLPH SCHNARR, OF ROCK ISLAND, ASSIGNOR OF ONE-FOURTH TO URIAH BORTNER, OF MOLINE, ILLINOIS.

HOLDBACK FOR CARRIAGES.

SPECIFICATION forming part of Letters Patent No. 484,464, dated October 18, 1892.

Application filed April 3, 1891. Serial No. 387,565. (No model.)

*To all whom it may concern:*

Be it known that I, HENRY RUDOLPH SCHNARR, a citizen of the United States, residing at the city of Rock Island, in the county of Rock Island and State of Illinois, have invented certain new and useful Improvements in Loop Attachments for Vehicles; and I do hereby declare the following to be a full, clear, and exact description of the invention, such as will enable others skilled in the art to which it appertains to make and use the same.

My invention relates to improvements in the manner of attaching loops to the shafts of vehicles. I attain this object by the use of a plate or cap attachment illustrated in the accompanying drawings, in which—

Figure 1:
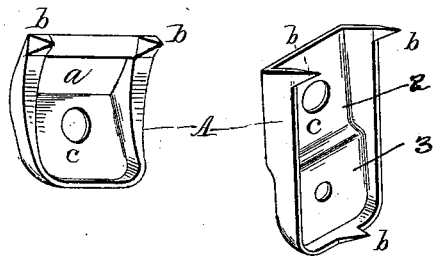
Figure 2:
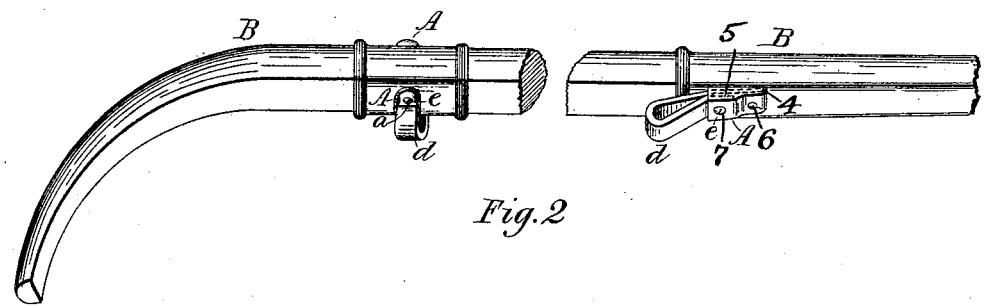

Figure 1 is a view of the under side of a metal cap or attachment A for holding the ends of a strip of leather or its equivalent when used for tug or holdback loops, showing slot $a$, spurs $b\,b$, and recess $c$. Fig. 2 is a sectional view of vehicle-shaft B, showing position of and connection of loops in and with the loop attachments.

The loop attachment A is a metal plate or cap made to fit and attach to the upper and lower side of a vehicle-shaft to secure the ends of a loop, and is held in place by the screw or pivot E and spurs $b\,b$. The inner side or front edge has the open slot $a$, corresponding to the width and thickness of loop required, running through to near the outer edge sufficient to admit the end of loop $d$, which when inserted and in place is held secure by a screw or pin E, passing through and entering the shaft. One end of loop $d$ being secured to the under side of the shaft B is then brought up and covered into attachment A through slot $a$ and secured, as shown in Fig. 2.

By the use of attachment A in fastening loop $d$ to the shaft a secure and safe attachment is made and the mode of wrapping the loop around the shaft done away with, leaving to view a clear, clean, and better finish.

Spurs $b\,b$ on inside of attachment A are to drive into the shaft in order to better keep it in proper place and position.

In case one of the loops gets broken another can easily be replaced by removing screw or pin E.

I am not confined to any particular size or form of the loop attachment, but retaining all the essential features herein specified.

The attachment used for the holdback-loop will be made heavier and elongated in order to meet the greater strain imposed upon the loop, will have the spurs $d\,d$, and attached by screws. It will be seen that the piece for holding the holdback-loop is provided with two seats or rests 2 3 for the ends of the loop, the seat 3 being in the rear of seat 2 and shallower than said seat 2. By this construction each end of the strap has a separate seat, as shown in dotted lines of Fig. 2, the end 4 extending rearward into the shallow seat and past the end 5, where it is held by a screw 6, the end 5 being held by the end 17, passing through the entire slip and both the ends of the strap.

Having fully described my invention, what I claim, and desire to secure by Letters Patent, is—

A clip for holding a loop to the thills, comprising a socketed main part having a seat for one end of the strap, a shallower extension for the other end of the strap, the spurs, and the openings for the screws in the main and extension portions, respectively, substantially as described.

In testimony whereof I hereby affix my signature in presence of two witnesses.

HENRY RUDOLPH SCHNARR.

Witnesses:
M. E. STEWART,
CHARLES PIPER.